(12) United States Patent
Lee

(10) Patent No.: US 6,728,454 B2
(45) Date of Patent: Apr. 27, 2004

(54) PREMISES OPTICAL CABLE WITH S-Z STRANDED STRENGTH MEMBER

(75) Inventor: Ho-Soon Lee, Taegukwangyok (KR)

(73) Assignee: Samsung Electronics Co., Ltd., Gu Suwon-si (KR)

( * ) Notice: Subject to any disclaimer, the term of this patent is extended or adjusted under 35 U.S.C. 154(b) by 0 days.

(21) Appl. No.: 10/337,118

(22) Filed: Jan. 6, 2003

(65) Prior Publication Data

US 2003/0138225 A1 Jul. 24, 2003

(30) Foreign Application Priority Data

Jan. 24, 2002 (KR) .................. 10-2002-0004116

(51) Int. Cl.[7] ............................................. G02B 6/44
(52) U.S. Cl. ...................................... 385/104; 385/105
(58) Field of Search ............................. 385/104, 105, 385/100, 147, 101

(56) References Cited

U.S. PATENT DOCUMENTS

| 6,195,487 | B1 | * | 2/2001 | Anderson et al. ............ 385/101 |
| 6,236,789 | B1 | * | 5/2001 | Fitz ............................... 385/101 |
| 6,389,204 | B1 | * | 5/2002 | Hurley ......................... 385/102 |
| 6,560,390 | B2 | * | 5/2003 | Grulick et al. ............... 385/100 |

* cited by examiner

*Primary Examiner*—Chandrika Prasad
(74) *Attorney, Agent, or Firm*—Cha & Reiter, L.L.C.

(57) ABSTRACT

Disclosed is a premises-fiber optical cable with a S-Z stranded-strength member, comprising: a plurality of inner tightly-coated optical fibers disposed at the central region of the optical cable and being S-Z type stranded; a plurality of inner yarns S-Z type-stranded for surrounding the inner tightly-coated optical fibers; a plurality of outer tightly-coated optical fibers S-Z type-stranded for surrounding the inner tightly-coated optical fibers and the inner yarns; a plurality of spirally-stranded outer yarns surround the outer tightly-coated optical fibers; and, an outer jacket disposed at the outer region of the optical cable for surrounding the outer yarns.

10 Claims, 6 Drawing Sheets

PREMISES OPTICAL CABLE WITH S-Z STRANDED STRENGTH MEMBER

CLAIM OF PRIORITY

This application claims priority to an application entitled "PREMISES OPTICAL CABLE WITH S-Z STRANDED STRENGTH MEMBER," filed in the Korean Industrial Property Office on Jan. 24, 2002 and assigned Serial No. 2002-4116, the contents of which are hereby incorporated by reference.

BACKGROUND OF THE INVENTION

1. Field of the Invention

The present invention relates to an optical-fiber cable and, more particularly, to a premises-fiber optical cable.

2. Description of the Related Art

Premises-fiber optical cables are employed in a network for interconnecting telephone offices to each other and in a network for connecting telephone subscribers to a distribution cable. In general, the diameter of an optical fiber is substantially smaller than that of a conventional telephone cable, but the optical fiber has a wider bandwidth. However, the optical fiber can be easily damaged by a tension stress applied to the optical fiber in the longitudinal direction or by an external impact applied to the optical fiber in the diametric direction.

FIG. 1 is a cross-sectional view of a premises-fiber optical cable having a spirally-stranded strength member, and FIG. 2 is an exploded side view of the premises optical cable shown in FIG. 1. As shown, the optical cable comprises twelve tightly-coated optical fibers 110 and 130, strength members 120 and 140, a rip cord 150, and an outer jacket 160. The twelve tightly-coated optical fibers 110 and 130 include three inner-coated, optical fibers 110 and nine outer-coated optical fibers 130. The strength members 120 and 140 include an inner-strength member made of an inner yarn 120 and an outer-strength member made of an outer yarn 140.

Th above structure is disclosed in U.S. Pat. No. 4,781,433, entitled "Optical Fiber Plenum Cable and Method of Making," in the names of Candido J. Arroyo, et al. Each of the inner and outer-coated optical fibers 110 and 130 comprises a core 132, a clad 134, and a tightly-coated layer 136. An exemplary inner-coated optical fiber 110 having an S-Z type stranded-lay configuration is disclosed in U.S. Pat. No. 4,828,352, entitled "S-Z Stranded Optical Cable," in the name of Heinrich A. Kraft.

The inner yarn 120 surrounds the circumferences of the three inner-coated, optical fibers 110 and is spirally wound around the central member. The inner yarn 120 maintains a stranding condition of the inner-coated, optical fibers 110 and serves to buffer an external pressure applied to the optical fibers. The inner and outer yarns 120 and 140 may be made of aramid yarn. The nine, outer-coated optical fibers 130 are S-Z type stranded and surround the inner yarn 120 and the inner tightly-coated optical fibers 110. Similarly, the outer yarn 140 surrounds the circumferences of the nine, outer-coated optical fibers 130 and are spirally stranded. Together with the inner yarn 120, the outer yarn 140 serves to buffer the external pressure applied to the optical fibers. The outer jacket 160 is disposed at the outermost region of the optical cable and formed by extrusion. The outer jacket 160 may be made of a polymer such as Polyvinyl Chloride. The rip cord 150 is disposed adjacent to the inner wall of the outer jacket 160 to allow a worker to remove the outer jacket 160 easily.

Briefly, a method for manufacturing the conventional premises optical cable is as follows. First, the inner tightly-coated optical fibers 110 are S-Z type stranded. Second, the inner yarn 120 is spirally stranded. Third, the outer tightly-coated optical fibers 130 are S-Z type stranded. Fourth, the outer yarn 140 is spirally stranded. Fifth, the outer jacket 160 is formed by extrusion.

In the aforementioned conventional premises optical cable, the inner-coated optical fibers 110 and the outer-coated optical fibers 130 are S-Z type stranded about the central member, but the inner yarn 120, interposed between the inner and outer tightly-coated optical fibers 110 and 130, is spirally stranded. Therefore, in case a pressure from the outside is applied to the premises optical cable, the inner yarn 120 can not buffer the external pressure sufficiently. That is, in the section where the inner yarn 120 is stranded in the same direction of the stranding of the inner and outer-coated optical fibers 110 and 130, the inner yarn 120 is parallel to the inner and outer coated optical fibers 110 and 130, thus having a comparatively large area that is capable of buffering the external pressure. However, in the section where the inner yarn 120 is stranded in the opposite direction of the stranding of the inner and outer-coated optical fibers 110 and 130, the inner yarn 120 is stranded in a crosswise direction to the inner and outer-coated optical fibers 110 and 130, thereby having a comparatively smaller area capable of buffering the external pressure. Therefore, due to the lack of the uniformity of the buffered area, the inner yarn 120 can not achieve a sufficient buffering function.

SUMMARY OF THE INVENTION

Therefore, the present invention has been made in view of the above problems and provides additional advantages by providing premises-fiber optical cables with an improved buffering function.

In accordance with the present invention, the premises optical cable with a S-Z stranded strength member includes: a plurality of tightly-coated inner optical fibers disposed at the central region of the optical cable and being S-Z type stranded; a plurality of inner yarns S-Z type stranded for surrounding the inner tightly-coated optical fibers; a plurality of tightly-coated outer optical fibers S-Z type stranded for surrounding the circumference of the tightly coated inner optical fibers; a plurality of outer yarns spirally stranded for surrounding the tightly-coated outer optical fibers; and, an outer jacket disposed at the outermost region of the optical cable for surrounding the outer yarns.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. For the purposes of clarity and simplicity, a detailed description of known functions and configurations incorporated herein will be omitted as it may make the subject matter of the present invention unclear.

Figure 1:
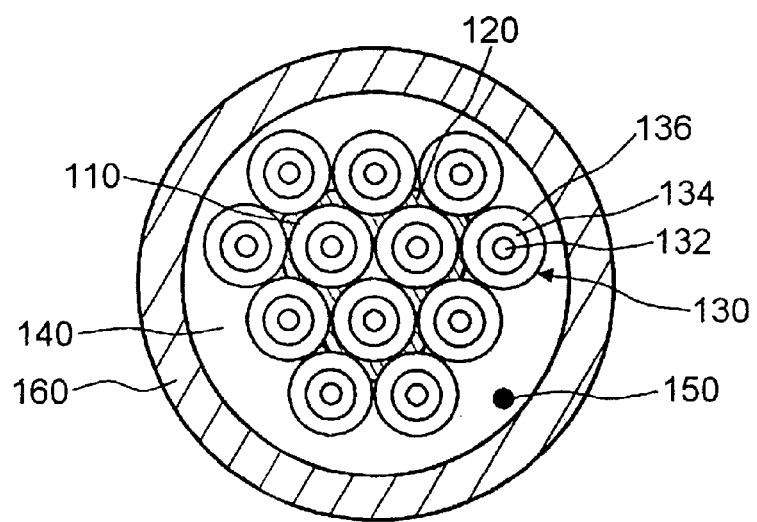
FIG. 1 is a cross-sectional view of a premises optical cable provided with a conventional spirally-stranded strength member.
Figure 2:
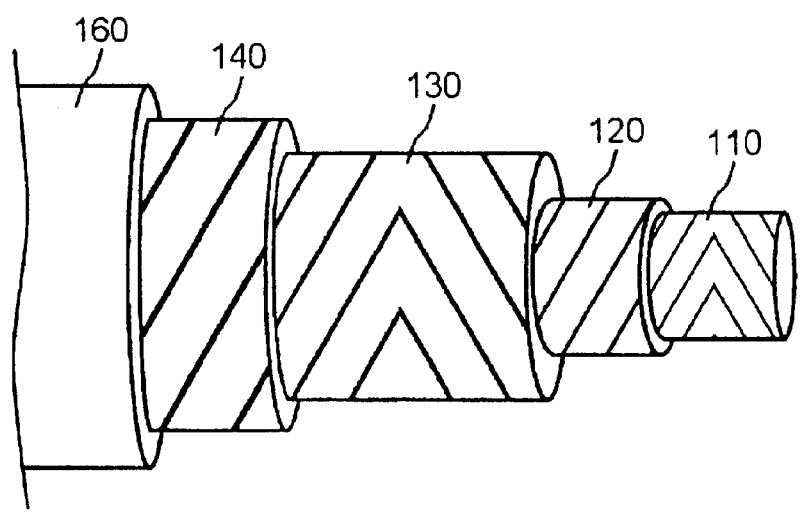
FIG. 2 is an exploded side view of the premises optical cable of FIG. 1.
Figure 3:
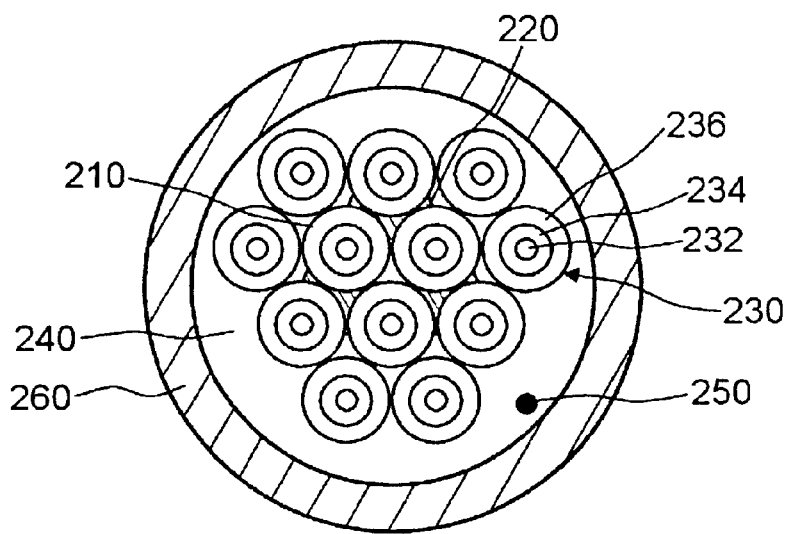
FIG. 3 is a cross-sectional view of a premises optical cable provided with an S-Z type stranded strength member in accordance with a preferred embodiment of the present invention.
Figure 4:
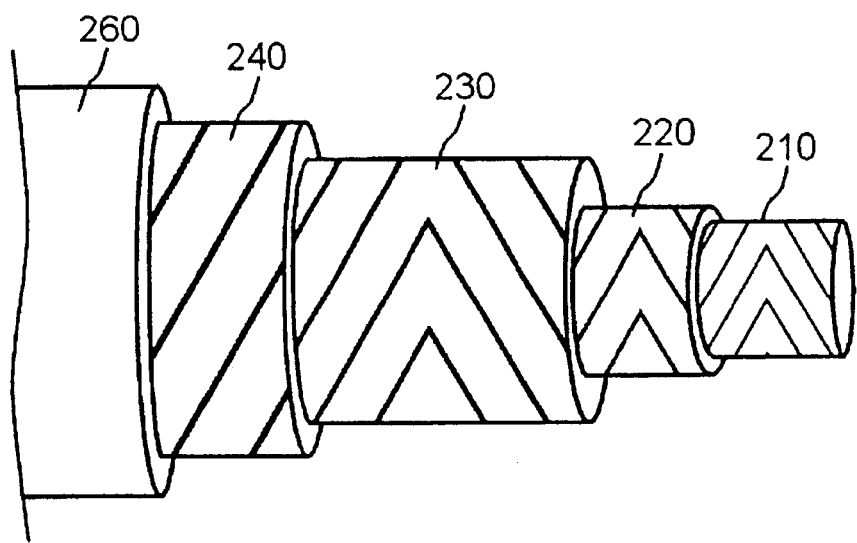
FIG. 4 is an exploded side view of the premises optical cable of FIG. 3.

FIG. 3 is a cross-sectional view of a premises optical cable having a S-Z type stranded strength member in accordance with a preferred embodiment of the present invention, and FIG. 4 is an exploded side view of the premises optical cable shown in FIG. 3. The premises optical cable of the present invention comprises twelve tightly-coated optical fibers 210 and 230, strength members 220 and 240, a tip cord 250, and an outer jacket 260. The twelve, tightly-coated optical fibers 210 and 230 include three, inner tightly-coated optical fibers 210 and nine, outer tightly-coated optical fibers 230. The strength members 220 and 240 include an inner strength member made of an inner yarn 220 and an outer strength member made of an outer yarn 240.

Each of the inner and outer tightly-coated optical fibers 210 and 230 comprises a core 232, a clad 234, and a tightly-coated layer 236. The inner and outer tightly-coated optical fibers 210 and 230 are S-Z type stranded. The tightly-coated optical fiber 210 or 230 has a comparatively larger diameter than the core 232 and the clad 234. Further, the tightly-coated layer 236 serves as a strength member, thereby providing a resistance to the tension applied thereto. The tightly-coated layer 236 is made of a polymer such as polyvinyl chloride, polyester elastomer (for example, Hytrel made by Dupont), polyester, polyethylene, nylon, etc.

The inner yarn 220 surrounds the circumference of the three inner tightly-coated optical fibers 210 and also are S-Z type stranded. The inner yarn 220 serves to buffer the external pressure applied to the optical fibers. The inner and outer yarns 220 and 240 are made of an aramid yarn, a glass yarn, a paper tape, a polyester tape, etc.

As the inner yarn 220 is stranded in the same direction of the stranding of the inner and outer tightly-coated optical fibers 210 and 230, the inner yarn 220 is disposed in parallel to the inner and outer tightly-coated optical fibers 210 and 230. Therefore, the buffered area covered by the inner yarn 220 is uniform in the whole section of the premises optical cable in the present invention.

The nine, outer tightly-coated optical fibers 230 are S-Z type stranded and surround the inner yarn 220 and the inner tightly-coated optical fibers 210. The outer yarn 240 surrounds the circumference of the nine, outer tightly-coated optical fibers 230 and are spirally stranded. Together with the inner yarn 220, the outer yarn 240 further serves to buffer the external pressure applied to the optical fibers. The outer jacket 260 is disposed at the outermost region of the optical cable and formed by an extrusion process. The outer jacket 260 is made of a polymer such as polyvinyl chloride, polyolefin, polyethylene, etc. Lastly, the rip cord 250 is formed adjacent to the inner wall of the outer jacket 260 to allow a worker to remove the outer jacket 260 easily. The rip cord 250 is made of an aramid yarn or a polyester yarn.

Figure 5:
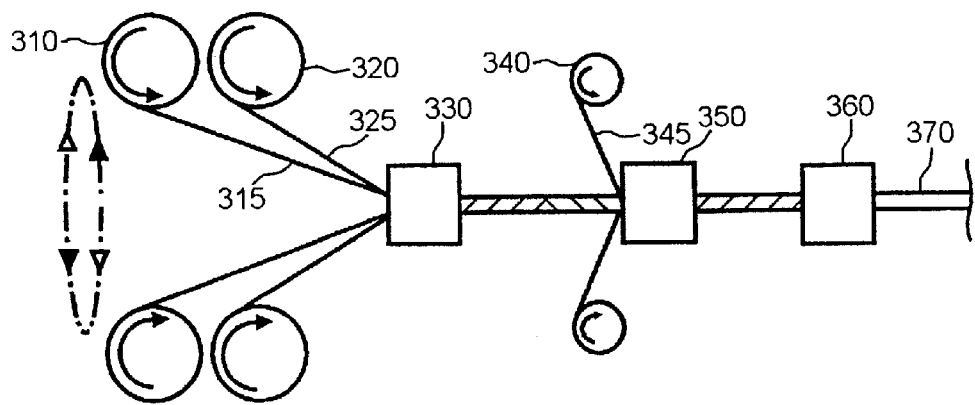
FIG. 5 schematically shows an apparatus for manufacturing the premises optical cable in accordance with the preferred embodiment of the present invention; and, FIG. 6 is a cross-sectional view of a guide used in the apparatus of FIG. 5.
Figure 6:
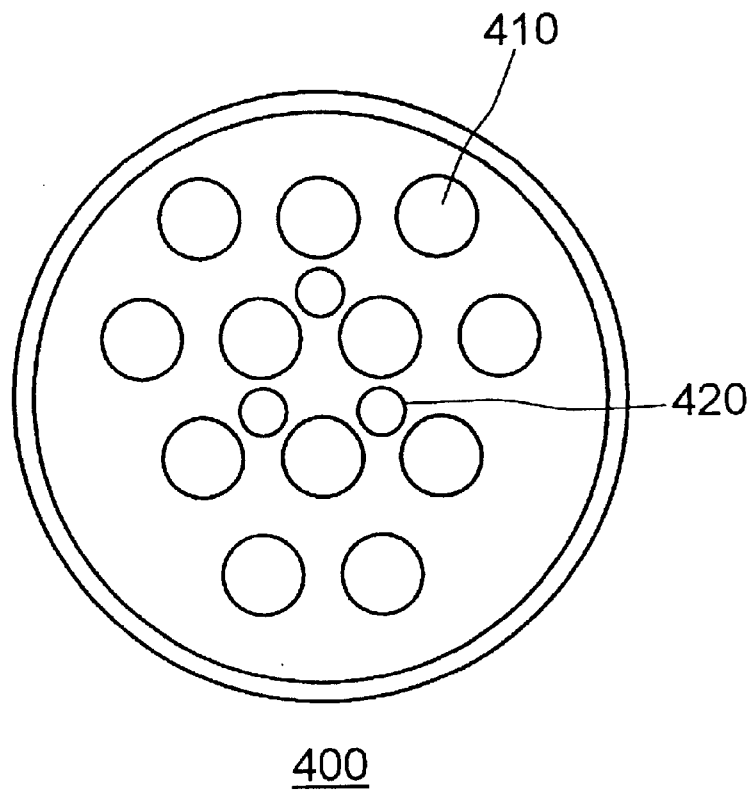

FIG. 5 is a schematic diagram of an apparatus for manufacturing the premises optical cable in accordance with the preferred embodiment of the present invention, and FIG. 6 is a cross-sectional view of a guide used in the apparatus of FIG. 5. The apparatus comprises a plurality of optical-fiber releasing units 310, a plurality of inner yarn-releasing units 320, a S-Z type-stranding unit 330, a plurality of outer-yarn releasing units 340, a spiral type-stranding unit 350, and an outer-jacket extruding unit 360. Briefly, a method for manufacturing the premises optical cable of the present invention is performed as follows: First, the inner and outer tightly-coated optical fibers 315 and the inner yarns 320 are S-Z type stranded. Second, the outer yarn 345 is spirally stranded. Third, the outer jacket 370 is formed by extrusion.

Each optical-fiber releasing unit 310 may be a spool on which a tightly-coated optical fiber 315 is wound and releases the tightly-coated optical fiber 315 by its rotational motion. Similarly, each inner yarn-releasing unit 320 may be a spool on which an inner yarn 325 is wound and releases the inner yarn 325 by its rotational motion.

The S-Z type-stranding unit 330 serves to S-Z type strand the tightly-coated optical fibers 315 released from the plural optical-fiber releasing units 310 and the inner yarns 325 released from the inner-yarn-releasing units 320. In order to strand the tightly-coated optical fibers 315 and the inner yarns 325, the S-Z type stranding unit 330 may use a guide 400, as shown in FIG. 6. As shown, the guide 400 comprises twelve large holes 410 and three small holes 420. The tightly-coated optical fibers 315 pass through the corresponding large holes 410, and the inner yarns 325 pass through the corresponding small holes 420.

Each outer yarn-releasing unit 340 may be a spool on which an outer yarn 345 is wound and releases the outer yarn 345 by its rotational motion. The spiral type stranding unit 350 serves to spirally strand the outer yarns 345 released from the outer yarn-releasing units 340 around the inner yarns 325. Here, a rip cord (not shown) is stranded together with the plural outer yarns 345.

Finally, the outer jacket extruding unit 360 extrudes an outer jacket 370 to surround the outer yarns 345, which is disposed at the outermost region of the premises optical cable of the present invention.

As apparent from the above description, the inner tightly-coated optical fibers, the inner yarns, and the outer tightly-coated optical fibers are all S-Z type stranded in the premises optical cable of the present invention, to improve its buffering function.

Although only a few embodiments of the present invention have been described in detail, those skilled in the art will appreciate that various modifications, additions, and substitutions to the specific elements are possible, without departing from the scope and spirit of the invention as disclosed in the accompanying claims.

What is claimed is:

1. A premises-fiber optical cable having a S-Z stranded strength member, comprising:

a plurality of inner-coated optical fibers disposed at a central region of the optical cable and having an S-Z type-stranded configuration;

a plurality of inner yarns S-Z type stranded around the inner-coated optical fibers;

a plurality of outer-coated optical fibers S-Z type-stranded around the inner tightly-coated optical fibers and the inner yarns;

a plurality of outer yarns spirally stranded around the outer tightly-coated optical fibers; and, an outer jacket disposed at the outermost region of the optical cable around the outer yarns.

2. The premises-fiber optical cable of claim 1, further comprising a rip cord disposed adjacent to the inner wall of the outer jacket for removing the outer jacket.

3. The premises-fiber optical cable of claim 1, wherein the outer-coated optical fibers comprises at least twelve optical fibers.

4. The premises-fiber optical cable of claim 1, wherein the premise-fiber optical cable includes at least three, inner-coated optical fibers and at least nine, outer-coated optical fibers.

5. The premises-fiber optical cable of claim 1, wherein the inner-coated optical fibers comprises at least three optical fibers.

6. The premises-fiber optical cable of claim 1, wherein the outer-coated optical fibers comprise an S-Z type-stranded lay configuration.

7. The premises-fiber optical cable of claim 1, wherein the outer-coated optical fibers comprise an S-Z type-stranded lay configuration.

8. The premises-fiber optical cable of claim 1, wherein the inner-coated optical fibers comprises at least one core, clad, and a coated layer.

9. The premises-fiber optical cable of claim 1, wherein the outer-coated optical fibers comprises at least one core, clad, and a coated layer.

10. The premises-fiber optical cable of claim 9, wherein the coated layer is made of a polymer material selected from one of polyvinyl chloride, polyester elastomer, polyester, polyethylene, and nylon.

* * * * *